Patented Dec. 5, 1939

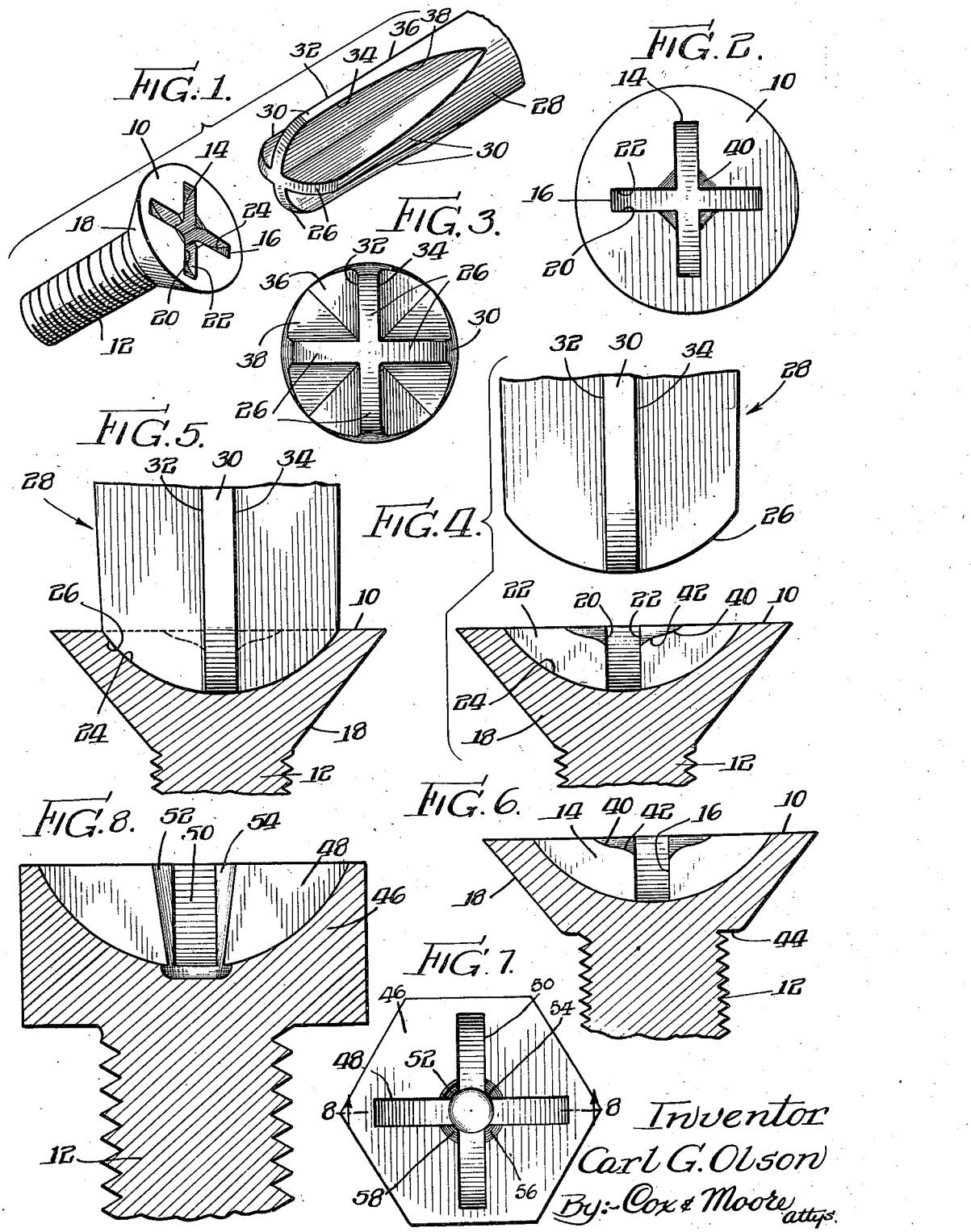

2,182,568

UNITED STATES PATENT OFFICE 2,182,568

SCREW

Carl G. Olson, Chicago, Ill., assignor to Illinois Tool Works, Chicago, Ill., a corporation of Illinois Application April 15, 1937, Serial No. 137,015

4 Claims. (Cl. 85—45)

This invention relates generally to screws, and more particularly to screws having a specially designed recessed head to facilitate initial insertion of the screw in a work piece.

Conventional screw heads equipped with the usual single transverse slot present certain disadvantages and inconveniences which the present invention proposes to overcome. One of the most serious disadvantages resulting from the use of conventional screws and screw driver blades is that such constructions do not counteract the tendency for the screw to cant and do not prevent the blade from slipping out of the screw slot. In other words, a single conventional screw driver blade operating within a complementary single slot of the screw head only supports the screw against canting in one direction and it is very easy for the driver blade to slip out of the screw slot and mar the surface of the work. The present invention contemplates a screw to overcome these difficulties wherein the head is so recessed as to enable the use therewith of a multi-bladed screw driver.

More specifically, the present invention contemplates a screw as set forth above which is provided with a plurality of blade-receiving recesses terminating short of the periphery of the screw head so as to positively prevent a complementary screw driver from becoming laterally dislodged from the recess in the screw head. I propose to provide a screw, as set forth above, wherein a plurality of converging blade-receiving recesses are provided with bottom surfaces which cooperate with the side walls of the recesses in preventing inadvertent dislodgment of the screw driver from the screw head.

It is a further object of the present invention to provide a screw head, as set forth above, in which the blade-receiving recesses are relatively shallow and terminate short of the screw head margin or periphery so as to preclude weakening the screw head structure.

Another object of the invention is to provide a screw head, as set forth above, in which pilot surfaces facilitate the insertion of a multi-blade driving element into the recesses of the screw head.

A still further object of the invention is to provide a more effective and stronger driving element particularly adapted for use with screws of the type set forth above.

Other objects and advantages will be more apparent from the following detailed description when considered in connection with the accompanying drawing, wherein:

Fig. 1 is a perspective view of a screw and driving device embodying my invention.

Fig. 2 is a top plan view of the screw.

Fig. 3 is a bottom end view of the driving element.

Fig. 4 is a view showing the driving element and screw, the screw element being shown in cross section.

Fig. 5 is a view showing the screw and driving element in driving relation, the screw element being shown in cross section.

Fig. 6 is a sectional view showing applicant's invention embodied in a screw of a different type.

Fig. 7 is a plan view of a hexagonal head screw made in accordance with applicant's invention.

Fig. 8 is an enlarged vertical section taken along the line 8—8 of Fig. 7.

As shown in Figs. 1, 2, 4 and 5, the head 10 of the screw, which has the usual threaded body portion 12, is provided with a pair of intersecting grooves or recesses 14 and 16 that terminate a substantial distance from the periphery of the flat upper surface of the screw head and are relatively shallow, the deepest point of each groove being spaced a substantial distance above the bottom of the countersunk side 18 of the head 10. Each of the grooves 14 and 16 has flat parallel side walls 20 and 22 and a concave, circular or arcuate bottom wall or surface 24 which is adapted to bear directly against the complemental portion of the convex, spherical or arcuate end surface 26 of a driving element 28. The driving element 28 comprises a shank formed at its lower end with a plurality of blades generally indicated at 30. Each blade 30 has a pair of parallel, flat, longitudinal side walls 32 and 34 extending inwardly from the arcuate surface 26 and terminating in diverging side walls 36 and 38. The diverging side wall portions 36 and 38 are tangent to the portions 32 and 34.

The four internal corners formed by the intersecting grooves 14 and 16 are chamfered or cut away as shown more particularly in Figs. 4, 5 and 6 to form an upper concave surface portion 40 merging into a lower convex surface portion 42, these surfaces forming a guide or pilot section which facilitates the insertion of the driving element in the screw head. The radius of the concave portion 40 is substantially equal to the radius of the spherical end surface 26 of the driving element 28. These four concave portions 40 therefore cooperate with each other to guide the driving element to a position centrally of the screw head and the four convex portions 42 exert a camming action on the walls 32 and 34 to force the ribs or blades 30 into the recesses 14 and 16. The operation of inserting the driving element into the screw is thus quickly performed, the concave portions 40 positioning the driving element centrally of the screw head and the convex portions 42 causing the blades 30 to snap into the grooves 14 and 16.

In the manufacture of screws having slotted heads the depth of the slot is of material significance. A slot of too great depth weakens the head of the screw to such an extent that a relatively slight turning force applied thereto will twist or break the head from the shank. On the other hand, a single, shallow, flat bottomed slot that extends to the periphery of the screw head so weakens the head that the sections lying on either side of the slot are readily sheared off along the plane extending through the bottom of the slot. Furthermore, in the case of a single slot the blade of the driving element is held against canting only in one direction and therefore it is a common occurrence for the blade of the driving element to slip out of the slot, marring the surface of the work piece and chipping the side walls of the slot in the screw head. The chipped side walls of the slot then act as a cam surface and force the blade of the driving element outwardly of the screw head whenever a turning force is applied thereto. This makes it practically impossible to remove or further tighten the screw.

By providing intersecting slots, the bottoms of which are concave, circular or arcuate in cross section, and by terminating the slots inwardly of the periphery of the screw head, applicant reduces the weakening of the screw head and absolutely prevents any canting or slipping of the driving element. The straight sides of the grooves exert no camming action on the blades of the driving element and therefore there is no possibility of the driving element being forced axially out of the slots. The curved portions 40 and 42 which cause the driving element to snap into the slots in the screw head allow the slots to be made of a width substantially equal to the width of the driving blades without at the same time making it difficult to insert the driving element into the screw head. This snugness of fit between the blades of the driving element and the screw head further insures against slippage of the driving element. The flat side walls of the slots have a further significance in that they permit the use of a conventional single blade screw driver if so desired.

In a tapping screw of the countersunk head type to be used to fasten relatively thin material, it is essential that the head should be no thicker or deeper than the part to be fastened and the thread on the body or shank of the screw must extend to the head, for otherwise there would be no thread to engage the second sheet of relatively thin material. It has been found that compliance with these conditions results in the production of a screw the head of which is not sufficiently strong to transmit the forces necessary to the placement or removal of the screw. By flattening the under side of the countersunk portion of the head as shown at 44 in Fig. 6 the thickness of an enlarged head may be made equal to the thickness of the material to be fastened. This makes it possible to roll the thread 12 beyond the point where the enlarged head and the shank of the screw would ordinarily meet to thereby insure a full thread on the screw. Cross grooves of the formation shown in Figs. 1, 2, 4 and 5 are particularly advantageous in connection with this type of tapping screw because the curved or arcuate bottom of the recesses permits sufficient material to be presented between the recesses and the flattened under side of the head to withstand the twisting forces applied thereto.

In the modification of Figs. 7 and 8 a hexagonal head screw 46 is provided with a pair of intersecting grooves 48 and 50, similar to the grooves 14 and 16 and terminating inwardly of the periphery of the screw head. The center of the head is drilled or otherwise cut to provide gradually inwardly tapering arcuate pilot sections or surfaces 52, 54, 56 and 58 connecting the adjacent portions of the intersecting grooves 48 and 50. These arcuate gradually inwardly tapering pilot sections or surfaces are of particular significance and are of outstanding advantage in mass production work in that they facilitate the insertion of the driving element into the screw head. The driving element for the screw of Fig. 8 may be provided with a tapering pin or projection extending downwardly from the end surface to form a pilot adapted further to facilitate the insertion of said driving element into the screw head.

The included angle of the converging sections or surfaces 52, 54, 56 and 58 must not exceed fifteen degrees (15°) to enable the desired frictional cooperation thereof with complementary surface sections of a turning tool or screw driver. This is of great practical significance in instances where the screws must be temporarily secured or retained upon and in coaxial relation with a screw driver before actual insertion within a work piece.

It will be seen from the above description that applicant has provided a screw in which a plurality of blade-receiving recesses positively prevent the complementary driver element from being axially or laterally dislodged from the screw head; in which the weakening of the head is reduced to a minimum and in which a plurality of pilot sections or surfaces facilitates the insertion of the driver element into the recesses of the screw head. Furthermore, it will be evident that by reason of the bluntness of the complementary driving element, this driving element possesses a considerable strength advantage over the tapering blades of known driving elements.

The invention is hereby claimed as follows:

1. A screw provided with a head having a flat upper surface and a plurality of intersecting, relatively shallow recesses, each of said recesses being provided with flat, parallel side walls and a concave bottom surface extending from and to said flat upper surface at points spaced inwardly of the periphery of the screw head to receive a driver bit with wings of like shape, the head of the screw having a central recess extending below said intersecting recesses at their point of intersection to receive a bottom projection on the driver bit to center said bit in said intersecting recesses.

2. A screw having intersecting, relatively shallow recesses in the head thereof, each of said recesses being provided with an arcuate bottom surface extending from and to the upper surface of the screw head at points spaced inwardly of its periphery, the corners formed by the intersecting recesses being cut away to provide arcuate pilot surfaces tapered inwardly from the upper surface of the screw head and extending beneath the bottoms of the recesses, said pilot surfaces being adapted to guide a driving element into said recesses.

3. A screw having intersecting, relatively shallow recesses in the head thereof, each of said recesses being defined by oppositely disposed wall surfaces and a longitudinally arcuate bottom surface, said screw head in the vicinity of the corners formed by said intersecting recesses presenting a plurality of concentrically disposed surfaces which converge at an included angle not in excess of fifteen degrees (15°) to enable frictional retention thereof with complementary surfaces of a turning tool.

4. A screw having intersecting, relatively shallow recesses in the head thereof, each of said recesses being defined by oppositely disposed wall surfaces and a longitudinal arcuate bottom surface, said screw head in the vicinity of the corners formed by said intersecting recesses being formed to present a plurality of concentrically disposed concave surfaces forming sections of a cone, the apex angle of which is not in excess of fifteen degrees (15°) to enable frictional retention of said surfaced sections with complementary surface sections of a turning tool.

CARL G. OLSON.